(12) United States Patent
Lin

(10) Patent No.: US 10,124,429 B1
(45) Date of Patent: Nov. 13, 2018

(54) SAW HAVING AUXILIARY FIXING DEVICE

(71) Applicant: Ping-Sheng Lin, Taichung (TW)

(72) Inventor: Ping-Sheng Lin, Taichung (TW)

(\*) Notice: Subject to any disclaimer, the term of this patent is extended or adjusted under 35 U.S.C. 154(b) by 0 days.

(21) Appl. No.: 15/641,260

(22) Filed: Jul. 4, 2017

(30) Foreign Application Priority Data

Jul. 11, 2016 (TW) .............................. 105121707 A

(51) Int. Cl.
| B27B 11/02 | (2006.01) |
| B23D 49/11 | (2006.01) |
| B27B 11/04 | (2006.01) |
| B27B 17/00 | (2006.01) |

(52) U.S. Cl.
CPC .............. B23D 49/11 (2013.01); B27B 11/02 (2013.01); B27B 11/04 (2013.01); *B27B 17/0083* (2013.01)

(58) Field of Classification Search
CPC ......... B23D 49/11; B27B 11/04; B27B 11/02; B27B 17/0083
See application file for complete search history.

(56) References Cited

U.S. PATENT DOCUMENTS

| 1,137,286 | A | * | 4/1915 | Ronconi | B27B 11/04 |
| | | | | | 30/372 |
| 1,492,721 | A | * | 5/1924 | Barrett | A01G 3/08 |
| | | | | | 83/465 |
| 2,273,329 | A | * | 2/1942 | Potter | A01G 3/08 |
| | | | | | 30/294 |
| 3,181,239 | A | * | 5/1965 | Skok | A01G 3/08 |
| | | | | | 30/294 |
| 3,755,896 | A | * | 9/1973 | Tommerup | B27B 19/002 |
| | | | | | 30/372 |
| 4,566,188 | A | * | 1/1986 | Wilson | A01G 3/08 |
| | | | | | 30/122 |
| 5,787,536 | A | * | 8/1998 | Pate | B27B 17/0008 |
| | | | | | 30/122 |
| 6,260,275 | B1 | * | 7/2001 | Good | A01G 3/08 |
| | | | | | 30/123 |
| 6,550,147 | B1 | * | 4/2003 | Fishlock | B23D 49/11 |
| | | | | | 30/371 |
| 9,288,947 | B1 | * | 3/2016 | Burnette | A01G 3/083 |
| 9,452,480 | B2 | * | 9/2016 | Treadwell | B23D 51/046 |
| 9,643,266 | B1 | * | 5/2017 | Hooyman | B23D 51/01 |
| 2004/0168328 | A1 | * | 9/2004 | Thomas | B23D 49/11 |
| | | | | | 30/517 |
| 2014/0190016 | A1 | * | 7/2014 | Pringnitz | B27B 21/04 |
| | | | | | 30/151 |

(Continued)

*Primary Examiner* — Sean Michalski

(57) ABSTRACT

A saw contains: a saw blade, a handle, and an auxiliary fixing device. The saw blade includes a serrated sawing section, a connection shaft, a fixing post defined between the connection shaft and the handle. The auxiliary fixing device includes two clamp extensions, wherein two front ends of the two clamp extensions are connected together by using a guiding section of the auxiliary fixing device. The auxiliary fixing device also includes two first elastic rings respectively rolled on two rear ends of the two clamp extensions, two second elastic rings individually formed in the two first elastic rings. Each second elastic ring is eccentric with each first elastic ring and its diameter is less than that of each first elastic ring, each second elastic ring is rotatably fitted with the connection shaft, and each first elastic ring abuts against the fixing post as not using the saw.

2 Claims, 5 Drawing Sheets

(56) References Cited

U.S. PATENT DOCUMENTS

| | | | |
|---|---|---|---|
| 2016/0000017 A1* | 1/2016 | Pringnitz | A01G 3/083 |
| | | | 144/343 |
| 2016/0318171 A1* | 11/2016 | Gonzales | B25G 1/04 |
| 2017/0021522 A1* | 1/2017 | McCracken | B27B 17/0091 |
| 2018/0141233 A1* | 5/2018 | Charest | B27B 17/0083 |

* cited by examiner

SAW HAVING AUXILIARY FIXING DEVICE

FIELD OF THE INVENTION

The present invention relates to a saw which clamps an object by way of the auxiliary fixing device and the saw blade so as to reduce the downward pressing force of the user, as operating the saw.

BACKGROUND OF THE INVENTION

A conventional saw is applied to saw objects, such as woods, plastic pipes, or metal objects etc. While sawing the objects, a handle of the saw is pulled and pushed repeatedly by a user so as to press a saw blade to saw the objects. However, it is exhausted to pull and push the handle repeatedly.

The present invention has arisen to mitigate and/or obviate the afore-described disadvantages.

SUMMARY OF THE INVENTION

The primary objective of the present invention is to provide a saw which clamps an object by way of the auxiliary fixing device and the saw blade so as to reduce the downward pressing force of the user.

Another objective of the present invention is to provide a saw which saws the object directly, when the object is not clamped by the two clamp extensions and the serrated sawing section due to the thickness of the object is more than the clamping distance, and the auxiliary fixing device lifts upwardly to avoid interfering the object.

To obtain the above mentioned objectives, a saw provided by the present invention contains: a saw blade, a handle, and an auxiliary fixing device.

The saw blade is elongated and is made of metal, and a rear end of the saw blade is in connection with the handle. The saw blade includes a serrated sawing section arranged on one side of the saw blade, a connection shaft inserted through a first orifice of the rear end of the saw blade, and a fixing post inserted through a second orifice defined between the connection shaft and the handle.

The auxiliary fixing device includes two clamp extensions mounted on two side surfaces of the sawing blade respectively and located adjacent to the serrated sawing section of the saw blade, wherein two front ends of the two clamp extensions are connected together by using a guiding section of the auxiliary fixing device in front of a front end of the saw blade.

The auxiliary fixing device also includes two first elastic rings, each of the two first elastic rings is rolled on a rear end of each of the two clamp extensions, and the auxiliary fixing device includes two second elastic rings, each of the two second elastic rings is formed in each first elastic ring, wherein each second elastic ring is eccentric with each first elastic ring and its diameter is less than that of each first elastic ring, each second elastic ring is rotatably fitted with the connection shaft, and each first elastic ring abuts against the fixing post as not using the saw.

Preferably, the guiding section of the auxiliary fixing device is arranged between the two front ends of the two clamp extensions and extends downwardly in relation to the serrated sawing section.

DETAILED DESCRIPTION OF THE PREFERRED EMBODIMENTS

Figure 1:
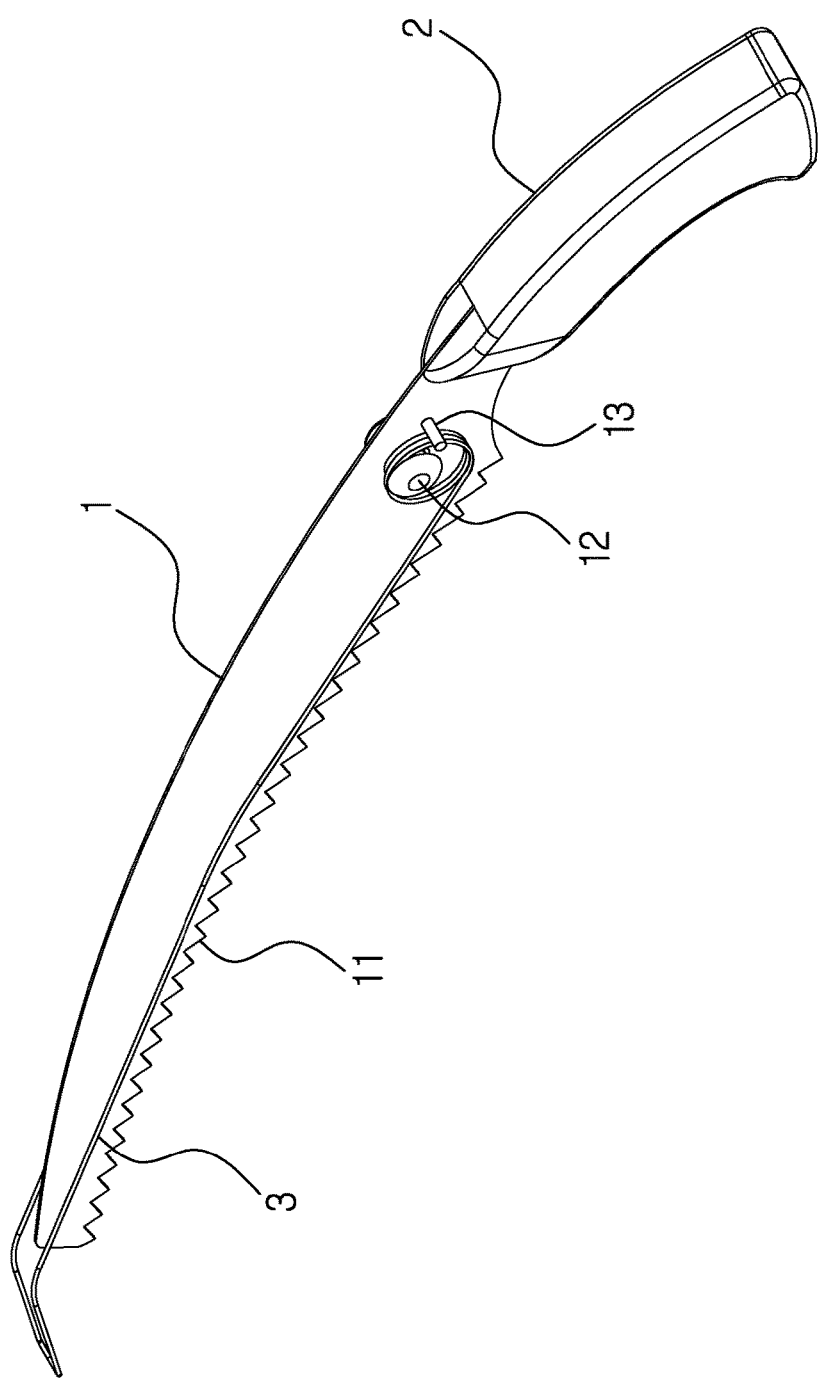
FIG. 1 is a perspective view showing the assembly of a saw according to a preferred embodiment of the present invention.
Figure 2:
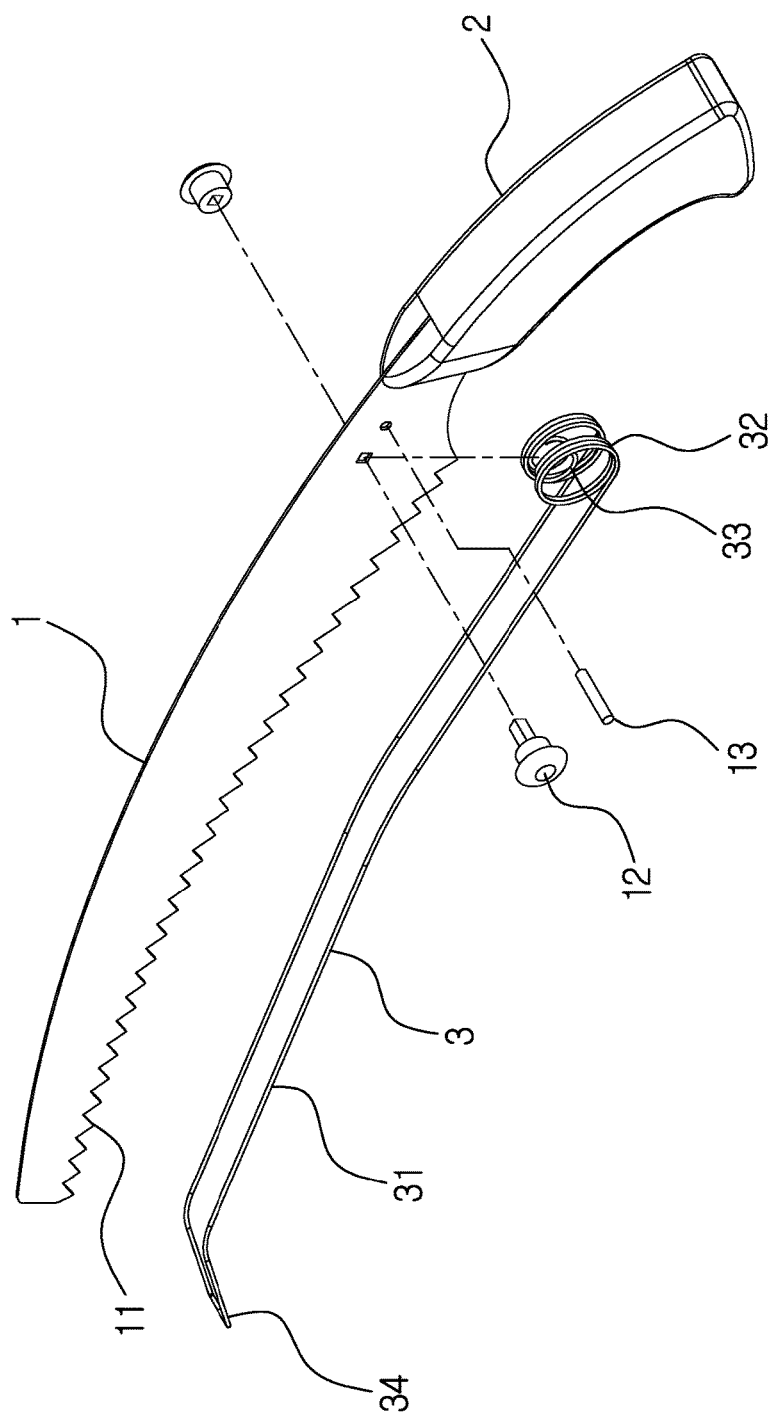
FIG. 2 is a perspective view showing the exploded components of the saw according to the preferred embodiment of the present invention.

With reference to FIGS. 1-5, a saw according to a preferred embodiment of the present invention comprises: a saw blade 1, a handle 2, and an auxiliary fixing device 3.

The saw blade 1 is elongated and is made of metal, and a rear end of the saw blade 1 is in connection with the handle 2. The saw blade 1 includes a serrated sawing section 11 arranged on one side thereof, a connection shaft 12 inserted through a first orifice of the rear end of the saw blade 1, a fixing post 13 inserted through a second orifice defined between the connection shaft 12 and the handle 2.

The auxiliary fixing device 3 includes two clamp extensions 31 mounted on two side surfaces of the sawing blade 1 respectively and located adjacent to the serrated sawing section 11 of the saw blade 1, wherein two front ends of the two clamp extensions 31 are connected together by using a guiding section 34 of the auxiliary fixing device 3 in front of a front end of the saw blade 1. The auxiliary fixing device 3 also includes two first elastic rings 32, each of the two first elastic rings 32 is rolled on a rear end of each of the two clamp extensions 31, and the auxiliary fixing device 3 includes two second elastic rings 33, each of the two second elastic rings 33 is formed in each first elastic ring 32, wherein each second elastic ring 33 is eccentric with each first elastic ring 32 and its diameter is less than that of each first elastic ring 32, each second elastic ring 33 is rotatably fitted with the connection shaft 12, and each first elastic ring 32 abuts against the fixing post 13 as not using the saw.

Figure 3:
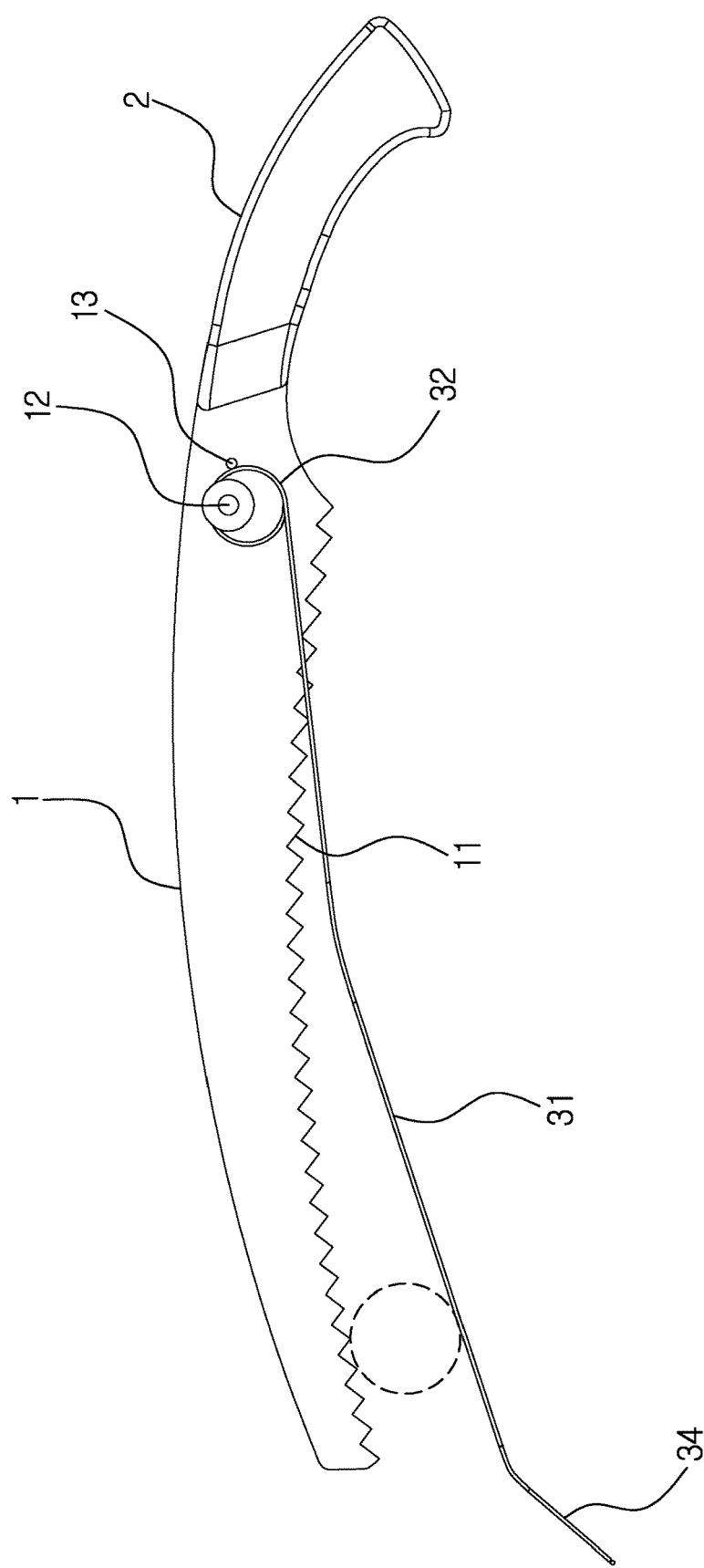
FIG. 3 is a side plan view showing the operation of the saw according to the preferred embodiment of the present invention.
Figure 4:
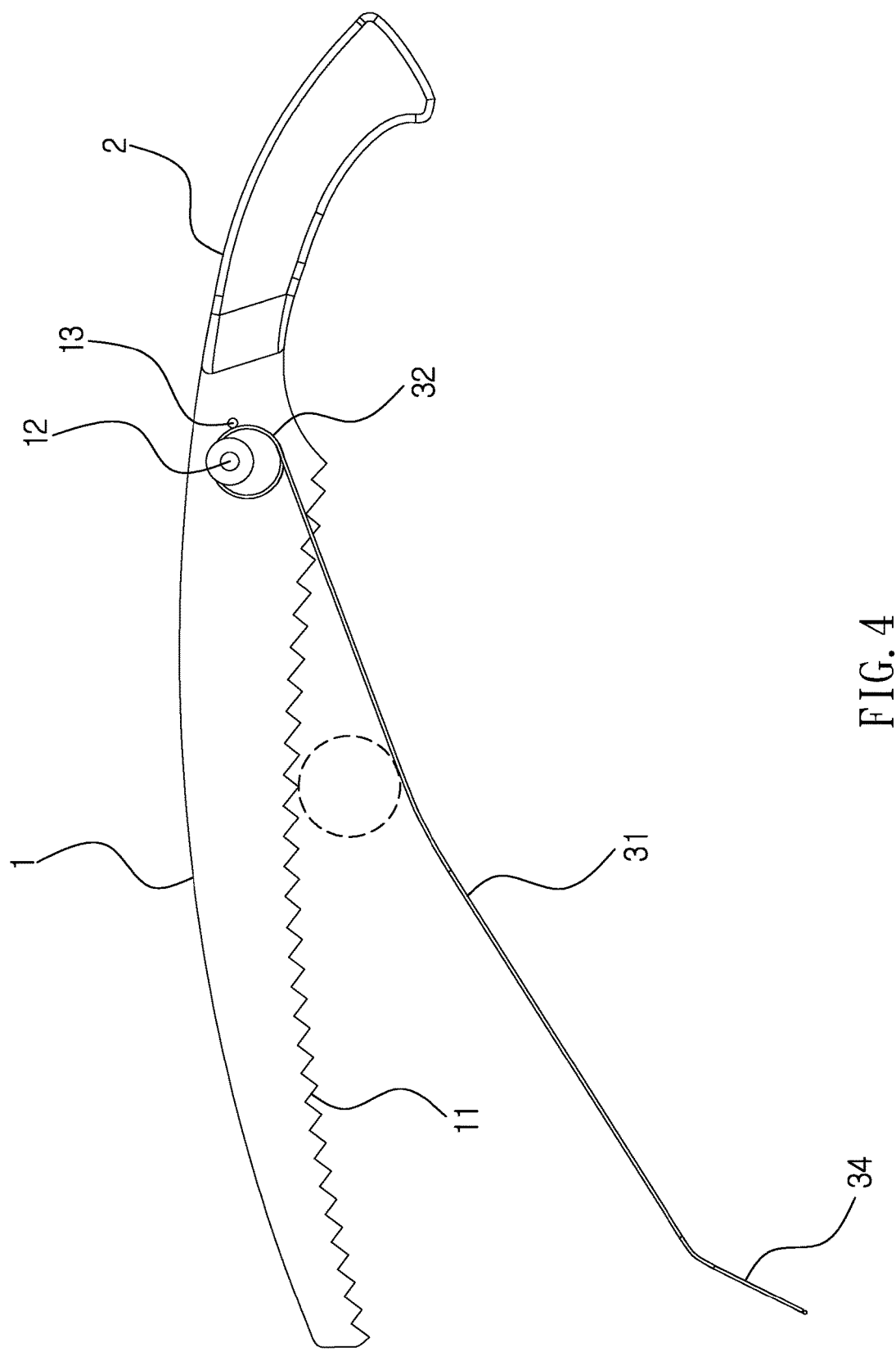
FIG. 4 is another side plan view showing the operation of the saw according to the preferred embodiment of the present invention.

When the two clamp extensions 31 and the serrated sawing section 11 clamp an object (as shown in FIGS. 3-4), the two first elastic rings 32 rotate along the connection shaft 12 and abut against the fixing post 13 so as to urge the two clamp extensions 31 to move close to the serrated sawing section 11 and to reduce a downward pressing force of a user as operating the saw.

Figure 5:
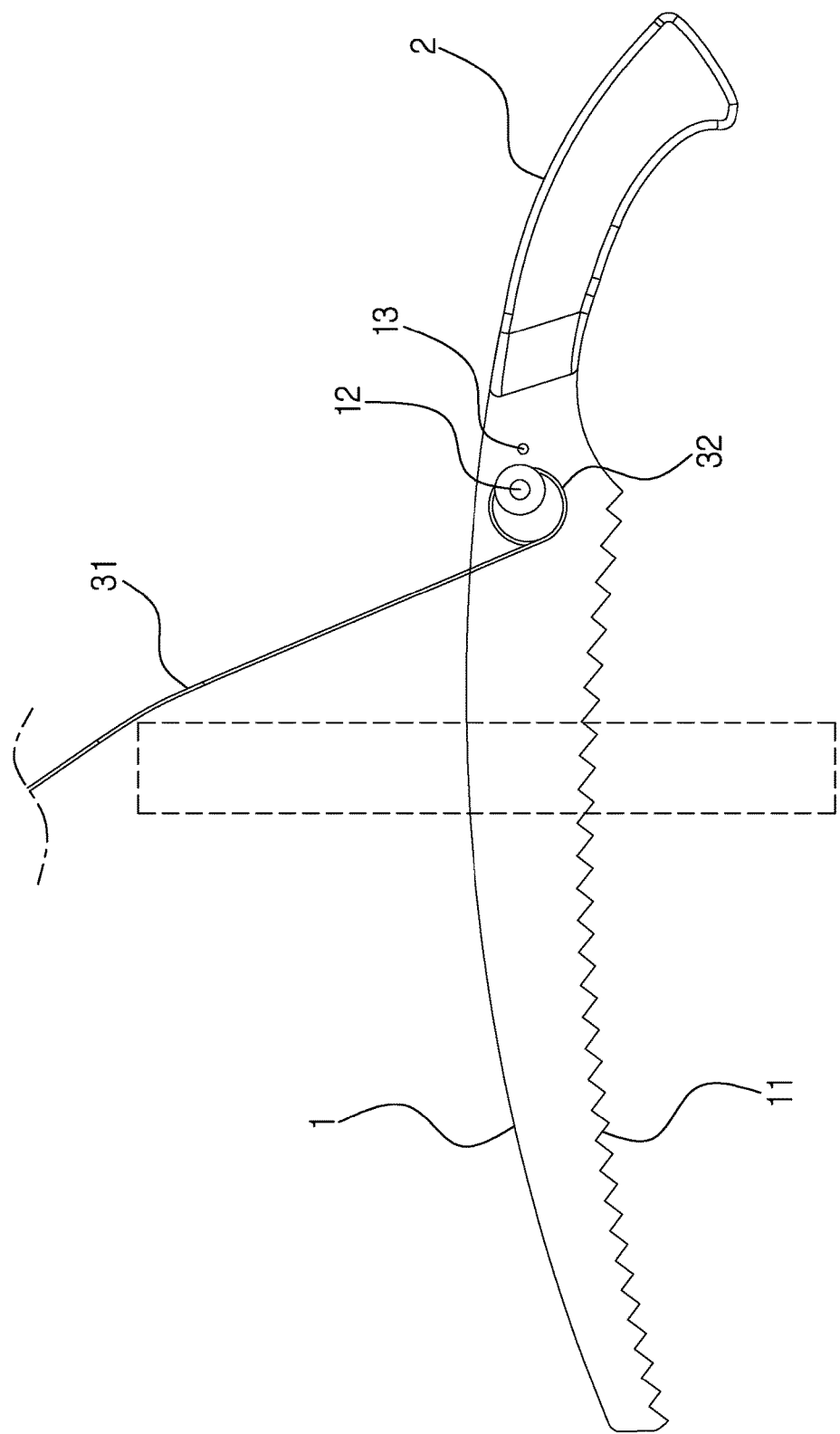
FIG. 5 is also another side plan view showing the operation of the saw according to the preferred embodiment of the present invention.

When a thickness of the object is more than a clamping distance among the two clamp extensions 31 and the serrated sawing section 11, as illustrated in FIG. 5, the two clamp extensions 31 lift upwardly by way of the two second elastic rings 33 and the connection shaft 12 after contacting with the object. In the meantime, the two first elastic rings 32 of the two second elastic rings 33 are away from the fixing post 13, and the two clamp extensions 31 are not interfered by the two first elastic rings 32 so as to lift upwardly.

The guiding section 34 of the auxiliary fixing device 3 is arranged between the two front ends of the two clamp extensions 31 and extends downwardly in relation to the serrated sawing section 11 so that when the user pulls the guiding section 34 downwardly, the guiding section 34 drives the two clamp extensions 31 to lift downwardly, hence the clamping distance forms among the two clamp extensions 31 and the serrated sawing section 11 so that the two clamp extensions 31 and the serrated sawing section 11 clamp the object in the clamping distance.

Accordingly, the auxiliary fixing device 3 and the saw blade 1 clamp the object so as to reduce the downward pressing force of the user. Preferably, when the object is not clamped by the two clamp extensions 31 and the serrated sawing section 11 due to the thickness of the object is more than the clamping distance, the object is s directly sawed by the saw blade, and the auxiliary fixing device 3 lifts upwardly to avoid interfering the object.

While the preferred embodiments of the invention have been set forth for the purpose of disclosure, modifications of the disclosed embodiments of the invention as well as other embodiments thereof may occur to those skilled in the art.

Accordingly, the appended claims are intended to cover all embodiments which do not depart from the spirit and scope of the invention.

What is claimed is:

1. A saw comprising: a saw blade, a handle, and an auxiliary fixing device;
    the saw blade being elongated and being made of metal, and a rear end of the saw blade being in connection with the handle; the saw blade including a serrated sawing section arranged on one side of the saw blade, a connection shaft inserted through a first orifice of the rear end of the saw blade, and a fixing post inserted through a second orifice defined between the connection shaft and the handle;
    the auxiliary fixing device including two clamp extensions mounted on two side surfaces of the sawing blade respectively and located adjacent to the serrated sawing section of the saw blade, wherein two front ends of the two clamp extensions are connected together by using a guiding section of the auxiliary fixing device in front of a front end of the saw blade;
    wherein the auxiliary fixing device also includes two first elastic rings, each of the two first elastic rings is rolled on a rear end of each of the two clamp extensions, and the auxiliary fixing device includes two second elastic rings, each of the two second elastic rings is formed in each first elastic ring, wherein each second elastic ring is eccentric with each first elastic ring and its diameter is less than that of each first elastic ring, each second elastic ring is rotatably fitted with the connection shaft, and each first elastic ring abuts against the fixing post as not using the saw.

2. The saw as claimed in claim 1, wherein the guiding section of the auxiliary fixing device is arranged between the two front ends of the two clamp extensions and extends downwardly in relation to the serrated sawing section.

* * * * *